US007666518B2

(12) United States Patent
Su et al.

(10) Patent No.: US 7,666,518 B2
(45) Date of Patent: Feb. 23, 2010

(54) REPROCESSED POLYHYDROXY AMINO ETHER COATED POLYPROPYLENE FILM

(75) Inventors: Tien-Kuei Su, North Kingstown, RI (US); Scott Narkevicius, Wakefield, RI (US)

(73) Assignee: Toray Plastics (America), Inc., N. Kingstown, RI (US)

( * ) Notice: Subject to any disclaimer, the term of this patent is extended or adjusted under 35 U.S.C. 154(b) by 103 days.

(21) Appl. No.: 11/484,589

(22) Filed: Jul. 12, 2006

(65) Prior Publication Data
US 2008/0014429 A1 Jan. 17, 2008

(51) Int. Cl.
B32B 27/00 (2006.01)
B32B 27/08 (2006.01)
B32B 15/04 (2006.01)

(52) U.S. Cl. .................. 428/500; 428/457; 428/515
(58) Field of Classification Search .................. None
See application file for complete search history.

(56) References Cited

U.S. PATENT DOCUMENTS

| | | | |
|---|---|---|---|
| 3,639,134 A | 2/1972 | Stegmeier et al. |
| 4,650,721 A | 3/1987 | Ashcraft |
| 4,725,466 A | 2/1988 | Crass et al. |
| 4,828,915 A | 5/1989 | Schroeder et al. |
| 4,956,232 A | 9/1990 | Balloni et al. |
| 4,997,700 A | 3/1991 | Bothe et al. |
| 5,049,423 A | 9/1991 | German, Jr. |
| 5,069,946 A | 12/1991 | Kuraray |
| 5,108,844 A | 4/1992 | Blemberg et al. |
| 5,126,401 A | 6/1992 | Chou |
| 5,141,801 A | 8/1992 | Takeshita et al. |
| 5,153,074 A | 10/1992 | Migliorini |
| 5,175,054 A | 12/1992 | Chu |
| 5,208,082 A | 5/1993 | Chou |
| 5,275,853 A | 1/1994 | Silvis |
| 5,286,575 A | 2/1994 | Chou |
| 5,376,437 A | 12/1994 | Kawakami et al. |
| 5,464,924 A | 11/1995 | Silvis et al. |
| 5,472,753 A | 12/1995 | Farha |
| 5,474,820 A | 12/1995 | Murschall et al. |
| 5,491,023 A | 2/1996 | Tsai et al. |
| 5,500,282 A | 3/1996 | Heffelfinger et al. |
| 5,512,649 A | 4/1996 | Hendrickson-Benkhoff et al. |
| 5,667,902 A | 9/1997 | Brew et al. |
| 5,688,556 A | 11/1997 | Wagner et al. |
| 5,877,257 A | 3/1999 | Fetell |
| 5,962,093 A | 10/1999 | White |
| 5,993,977 A | 11/1999 | Laiho et al. |
| 5,997,679 A | 12/1999 | Wheat et al. |
| 6,011,115 A | 1/2000 | Miharu et al. |
| 6,033,514 A | 3/2000 | Davis et al. |
| 6,033,771 A | 3/2000 | Heffelfinger |
| 6,087,020 A | 7/2000 | Vandekerckhove et al. |
| 6,106,933 A | 8/2000 | Nagai et al. |
| 6,106,982 A | 8/2000 | Mientus et al. |
| 6,109,006 A | 8/2000 | Hutchinson |
| 6,146,574 A | 11/2000 | Henkee |
| 6,180,715 B1 | 1/2001 | Schmidt |
| 6,211,290 B1 | 4/2001 | Xiao et al. |
| 6,326,068 B1 | 12/2001 | Kong et al. |
| 6,376,583 B1 | 4/2002 | Winkler et al. |
| 6,495,266 B1 | 12/2002 | Migliorini |
| 6,503,611 B1 | 1/2003 | Chang et al. |
| 6,503,635 B1 | 1/2003 | Kong et al. |
| 6,589,621 B1 | 7/2003 | Beckerdite |
| 6,641,913 B1 | 11/2003 | Hanyu et al. |
| 6,663,940 B1 | 12/2003 | Osame et al. |
| 6,703,134 B1 | 3/2004 | Parr et al. |
| 6,723,431 B2 | 4/2004 | Mallory et al. |
| 6,723,443 B2 | 4/2004 | Tsai et al. |
| 6,764,752 B2 | 7/2004 | Change et al. |
| 6,982,119 B2 | 1/2006 | Shi et al. |

(Continued)

FOREIGN PATENT DOCUMENTS

JP      2000/248124      9/2000

(Continued)

OTHER PUBLICATIONS

Glass, T et al. (2001) "Building Blox®-New Thermoplastic Adhesive and Barrier Resins," Dow Chemical Company Technical Report., 6 pages.

(Continued)

Primary Examiner—Sheeba Ahmed
(74) Attorney, Agent, or Firm—Morrison & Foerster LLP

(57) ABSTRACT

This invention relates to a biaxially oriented polypropylene (BOPP) film comprising a polyolefin-containing base layer with at least 1 weight percent recycled polyolefin material comprises polyhydroxy amino ether polymer (PHAE) and an amount of compatibilizing agent such that the laminate film has a gel count of less than 15 gels/80 in$^2$. The laminate film could have an optional tie-layer which could comprise PHAE adhered to one side; the polypropylene film contains an amount of reprocessed PHAE-containing film and a compatibilizing agent to reduce significantly or eliminate visual defects such as gels, voids, etc. The use of the compatibilizing agent with the reprocessed PHAE also aids in improving subsequent biaxial film orientation and maintains film properties. The film of the embodiments of the invention has excellent appearance and aesthetic properties and can be suitable for transparent, white opaque, or metallized film applications depending on formulation.

21 Claims, No Drawings

U.S. PATENT DOCUMENTS

| | | | |
|---|---|---|---|
| 7,163,727 B2 * | 1/2007 | Su et al. | 428/35.7 |
| 2003/0198815 A1 | 10/2003 | Walker et al. | |
| 2003/0220036 A1 * | 11/2003 | Lee et al. | 442/153 |
| 2005/0089682 A1 | 4/2005 | Su et al. | |
| 2005/0186414 A1 | 8/2005 | Su et al. | |
| 2006/0233988 A1 | 10/2006 | Su | |
| 2006/0257652 A1 | 11/2006 | Su | |
| 2006/0269755 A1 | 11/2006 | Song | |
| 2007/0031653 A1 | 2/2007 | Su | |
| 2007/0141372 A1 | 6/2007 | Su et al. | |
| 2008/0205800 A1 | 8/2008 | Su et al. | |

FOREIGN PATENT DOCUMENTS

| | | |
|---|---|---|
| WO | WO-97/09380 | 3/1997 |
| WO | WO-99/20673 | 4/1999 |
| WO | WO-02/45958 | 6/2002 |
| WO | WO-02/059177 | 8/2002 |

OTHER PUBLICATIONS

International Search Report dated Jul. 30, 2007, directed to counterpart PCT application No. PCT/US06/29537.

Arkema, S.A. Product brochure titled "Lotader: Ethylene acrylate based terpolymers," located at http://www.arkema.com/sites/group/fr/common/advanced_search.page3result. visitedon Oct. 2, 2007.

Technical data sheets for Lotader (R) Grade 4503, dated Jul. 2005, retrieved Jul. 6, 2007, located at www.lotader.com.

Schmitz, Peter et al. "Films." Ullman's Encyclopedia of Industrial Chemistry, 5th Ed., vol. A11 (1988), pp. 85-110.

Petrie, Edward. (2000) "Surfaces and Surface Preparation," Chapter 6 in Handbook of Adhesives and Sealants, McGraw-Hill, pp. 197-251.

PCT International Search Report and Written Opinion mailed Aug. 10, 2007, directed to related PCT/US06/17176; 9 pages.

International Preliminary Report on Patentability, dated Nov. 13, 2007, directed to International Patent Application No. PCT/US2006/017176; 6 pages.

Supplementary European Search Report, mailed Mar. 26, 2008, directed to counterpart Foreign Patent Application No. EP-0573735.4; 3 pages.

International Preliminary Report on Patentability mailed on Oct. 23, 2007 directed to International Patent Application No. PCT/US05/13116; 5 pages.

International Search Report and Written Opinion, mailed Feb. 15, 2006, directed to International Patent Application No. PCT/US05/13116; 8 pages.

International Search Report and Written Opinion, mailed Feb. 11, 2005, directed to counterpart International Patent Application No. PCT/US04/32433; 5 pages.

International Preliminary Report on Patentability, dated Apr. 3, 2006, directed to International Patent Application No. PCT/US2004/032433; 6 pages.

International Search Report, mailed Sep. 15, 2005 directed to counterpart International Patent Application No. PCT/US04/33687; 2 pages.

Supplementary European Search Report, mailed Mar. 26, 2008, directed to counterpart European Patent Application No. EP-04794917.7; 3 pages.

International Preliminary Report on Patentability, dated Feb. 5, 2008, directed International Patent Application No. PCT/US2006/029537; 5 pages.

Su et al., U.S. Office Action mailed Jun. 15, 2006, directed to U.S. Appl. No. 10/954,023; 7pages.

Su et al., U.S. Office Action mailed Dec. 1, 2006, directed to U.S. Appl. No. 10/954,023; 9 pages.

Su et al., U.S. Office Action mailed Jun. 13, 2007, directed to U.S. Appl. No. 10/954,023; 5 pages.

Su et al., U.S. Office Action mailed Sep. 18, 2007, directed to U.S. Appl. No. 10/954,023; 7 pages.

Su et al., U.S. Office Action mailed Mar. 17, 2008, directed to U.S. Appl. No. 10/954,023; 9 pages.

Su et al., U.S. Office Action mailed Sep. 18, 2008, directed to U.S. Appl. No. 10/954,023; 12 pages.

Su et al., U.S. Office Action mailed Dec. 22, 2008, directed to U.S. Appl. No. 11/705,127; 10 pages.

Su et al., U.S. Office Action mailed Jun. 9, 2009, directed to U.S. Appl. No. 11/705,127; 8 pages.

Su et al., U.S. Office Action mailed Aug. 25, 2005, directed to U.S. Appl. No. 10/690,709; 5 pages.

Su et al., U.S. Office Action mailed Feb. 27, 2006, directed to U.S. Appl. No. 10/690,709; 4 pages.

Su et al., U.S. Office Action mailed Jan. 3, 2008, directed to U.S. Appl. No. 11/107,928; 13 pages.

Su et al., U.S. Office Action mailed Jul. 11, 2008, directed to U.S. Appl. No. 11/107,928; 15 pages.

Su et al., U.S. Office Action mailed Oct. 8, 2008, directed to U.S. Appl. No. 11/107,928; 14 pages.

Su, T., U.S. Office Action mailed Jun. 25, 2008, directed to U.S. Appl. No. 11/194,768; 16 pages.

Su, T., U.S. Office Action mailed Dec. 12, 2008, directed to U.S. Appl. No. 11/194,768; 11 pages.

Su, T., U.S. Office Action mailed May 28, 2009, directed to U.S. Appl. No. 11/194,768; 12 pages.

Major Industrial polymers (2009). In Encyclopedia Britannica. Retrieved Jul. 9, 2009, from Encylcopedia Britannica Online: http://www.britannica.com/Ebchecked/topic/1426103/industrial-polymers.

Su et al., U.S Office Action mailed on Jul. 10, 2009; directe dto U.S Appl. No. 11/416,385; 12 pages.

* cited by examiner

REPROCESSED POLYHYDROXY AMINO ETHER COATED POLYPROPYLENE FILM

RELATED INVENTION

None.

FIELD OF INVENTION

This invention relates to a biaxially oriented polypropylene (BOPP) film containing reprocessed polyhydroxy amino ether (PHAE).

BACKGROUND OF INVENTION

Although recycling has a long history, it is only relatively recently that environmental protection and waste management issues have come to the forefront of both public and political awareness. Plastic recycling has predominately resulted from packaging applications such as packing films while other areas of polymeric waste include: construction, automotive, agriculture and electrical components.

In the production of BOPP films, the use of recycled or reprocessed propylene polymer-based pellets from waste or non-conforming BOPP films back into the core or base layer of said BOPP film is a common practice to reduce costs by replacing a portion of costlier virgin polypropylene material. Generally, the recycled material is similar in composition to the BOPP film it is being used in. This is to help maintain performance properties for the film's particular application and to maintain aesthetic appearance: It is generally desirable to have a film without gross defects such as gels, specks, excessive haze, low gloss, etc.

Some BOPP films can be modified with a skin layer to improve dramatically gas barrier properties. Such materials can either be coextruded or coated. In the case of coating, the skin layer can be applied via in-line coating (i.e. the barrier coating is done prior to transverse direction orientation in a sequential or simultaneous orientation line) or off-line coating (i.e. the barrier coating is done on a separate piece of equipment after the BOPP film is produced). Such high gas barrier materials are usually polar polymers like ethylene vinyl alcohol (EVOH) or polyvinyl alcohol (PVOH). Of particular interest is a polar polymer with exceptional gas barrier properties such as polyhydroxy amine ether (PHAE) which is currently being produced by ICI Packaging Coatings under the trade name "OXYBLOC®." Such polar polymers when used as skin layers on polypropylene films often require tie resins or high surface treatment to achieve adequate adherence to the propylene-based polymer substrate.

Recycling of PHAE-coated polypropylene films back into new film is difficult because of the inherent incompatibility between polar materials and non-polar materials. The PHAE-coated polypropylene films when recycled as pellets to be used in the core layer of new OPP films cause poor film appearance such as high haze and a preponderance of gels as well as processing issues such as film breaks. This is because the highly polar nature of PHAE does not disperse well and is basically immiscible with the non-polar polypropylene. Thus, the PHAE can form domains within the propylene-based polymer matrix which in turn, manifests itself in the bulk film as high haze, low gloss, and gels. These domains can also be points of high stress which can cause film breakage during transverse orientation.

Thus, the use of PHAE-coated BOPP as a recycled material for cost reduction is impractical. This then results in higher costs and larger amounts of scrap and waste material which must be disposed of.

U.S. Pat. No. 6,589,621 describes the composition of PHAE materials and the use of it in containers and laminate structures. Product literature from Kuraray Evalca of GF-30 compatibilizers for EVOH materials describes the use of these materials to help improve recyclability/reprocessing of EVOH in a polyolefin. Commonly owned U.S. Pat. No. 7,163,727 describes the use of PHAE on polyolefin and polyester substrates. Commonly-owned U.S. Patent Publication No. 2006/0233988 describes the use of PHAE of different resorcinol diglycidyl ether comonomer content on polyolefin and polyester film substrates. Commonly-owned U.S. Patent Publication No. 2007-0031653 describes the use of PHAE on polyolefin substrates using a tie-layer for improved adhesion. However, there is no mention or contemplation of using PHAE-containing scrap material as a recycle component in the above cited references.

This invention seeks to recycle PHAE-containing laminate films in a virgin polymer without loss in property of the films by combining the recycled PHAE-containing film and virgin polymer.

SUMMARY OF THE INVENTION

The embodiments of the invention relate to a laminate film comprising a polyolefin-containing base layer with at least 1 weight percent recycled polyolefin material comprising PHAE and an amount of compatibilizing agent such that the laminate film has a gel count of less than 15 gels/80 in$^2$. Preferably, the compatibilizer comprises an ethylene-containing polymer grafted or copolymerized with a functional group. Preferably, the functional group is selected from the group consisting of anhydride, hydroxyl, acid, ionomer, amide, ester and combinations thereof. Preferably, the laminate film contains at least 10 weight percent recycled polyolefin material comprising PHAE. Preferably, the laminate film contains at least 20 weight percent recycled polyolefin material comprising PHAE. In one variation, the laminate film could further comprise a tie-layer. Preferably, the polyolefin-containing base layer or the tie-layer is discharge-treated, optionally in an atmosphere of carbon dioxide, oxygen, nitrogen or combinations thereof. Preferably, the tie-layer comprises a polyetheramine resin-containing material.

The laminate film could further comprise a vacuum deposited metal layer on the polyetheramine resin-containing layer, the metal layer optionally being an aluminum layer. Preferably, a haze of the laminate film is less than 15 percent.

The laminate film could further comprise a heat sealable layer or a winding layer, the heat sealable layer optionally comprising an antiblock component selected from the group consisting of amorphous silica, aluminosilicate, sodium calcium aluminum silicate, a crosslinked silicone polymer, and polymethylmethacrylate; and the winding layer optionally winding layer comprising a crystalline polypropylene and an inorganic antiblocking agent. Preferably, the winding layer comprises a matte layer of a block copolymer blend of polypropylene and one or more other polymers, the matte layer having a roughened surface, and the winding layer is optionally a discharge treated winding layer having a surface for lamination or coating with adhesives or inks. Preferably, the winding layer comprises an antiblock component selected from the group consisting of amorphous silica, aluminosilicate, sodium calcium aluminum silicate, a crosslinked silicone polymer, and polymethylmethacrylate. Preferably, the polyolefin-containing base layer comprises cavities. Preferably, the polyolefin-containing base layer further comprises TiO$_2$. Preferably, the winding layer comprises a matte layer of a block copolymer blend of polypropylene and one or more other polymers, the matte layer having a roughened surface, and the winding layer is optionally a discharge treated winding layer having a surface for lamination or coating with adhesives or inks. Preferably, the winding layer comprises an antiblock component selected from the group consisting of amorphous silica, aluminosilicate, sodium calcium aluminum silicate, a crosslinked silicone polymer, and polymethylmethacrylate.

DETAILED DESCRIPTION OF THE INVENTION

The term "recycled" means using waste or non-conforming material to manufacture a new product. Recycling involves altering the physical form of an object or material and making a new object from the altered material. One must generate waste or non-conforming material in order to recycle the waste. Therefore, if one is recycling, one would first already generate waste or non-conforming material.

The term "waste" refers to objects or materials for which no use or reuse is generally intended.

Reuse, which refers to using an object or material again, either for its original purpose or for a similar purpose, without significantly altering the physical form of the object or material, is not recycling because reuse does not alter the physical form of an object. Reuse is preferred to recycling because reuse consumes less energy and fewer resources than recycling. However, reuse is not always possible, particularly for a polymer that has already been formed into an object and the polymer then has to be used in a new and different object. Of course, recycling generally consumes less energy and resources than making new replacement objects with unrecycled (i.e., new or virgin) material.

Plastic recycling by the embodiments of this invention includes recycling of waste packaging, particularly polyolefin-containing waste that includes PHAE. Other embodiments of the invention relate to optimum waste management strategies considering the full spectrum of available options. The main area includes recycling PHAE-containing plastic materials by re-processing of these plastic materials into new products.

The embodiments of this invention address the above issue of recycling PHAE-coated polypropylene-based films back into new polypropylene-based films and reduce scrap, waste, and cost. The embodiments of the invention provide a solution to improve the recyclability by adding a compatibilizing agent into the recycled material stream either during the resin recycling/reprocessing process or during production of new film. The compatibilizing agent is composed of a polyolefin and polar functional groups like anhydride, acid, ionomers, hydroxyl, ester, and/or amide.

It has been found that by using epoxy-amine polymers (aka polyetheramine, polyhydroxy amino ether, PHAE) in a contiguous layer formed upon a polyolefin or polyester film substrate results in a multilayer film structure exhibiting superior gas barrier properties and an exceptionally high surface energy. Unlike EVOH or related materials such as PVOH, however, no tie-layer or adhesion promoting materials such as anhydride-grafted polyolefins are required to bond the polar layer to such a polyolefin or amorphous copolyesters or primers to a polyethylene terephthalate film substrate. Adequate adhesion of the polyetheramine is found without the need of such intermediate adhesion promoting layers or tie resins. Thus, product cost can be reduced as expensive tie-layers and capital for specialty multi-layer compositing dies can be avoided. Moreover, because of the amorphous nature of polyetheramine, biaxial orientation of a layer of polyetheramine upon the polyolefin or polyester substrate is easily achieved, with no attendant cracking or peeling of the polyetheramine under stretching forces and temperatures. In addition, because of the high hydroxyl content of the polyetheramine composition, such a layer's surface energy is sufficiently high enough that no discharge-treatment method is required post-film-forming. This inherently high surface energy makes it readily suitable as a printing, metallizing, coating, or laminating surface. However, like EVOH, polyetheramine is sensitive to humidity in that high humidity conditions can negatively impact its gas barrier properties. Thus, like EVOH, polyetheramine should be protected against humidity effects if used as part of a multilayer film or laminate, whereby the polyetheramine layer should be buried between other layers or by a metal coating such as vapor-deposited metal.

Nevertheless, although adequate adhesion of the polyetheramine layer has been found using processing methods such as off-line coating of polyetheramine aqueous solutions to a discharge-treated polyolefin substrate without requiring the use of tie-layer or adhesion-promoting materials, it has been found that when using in-line coating methods in particular, discharge-treatment of the substrate prior to coating is not always sufficient to ensure adequate adhesion of the polyetheramine layer to the polyolefin substrate layer. Even though a discharge-treatment method is employed prior to the in-line coating station (i.e. after machine direction orientation in a sequential biaxial orientation method but prior to the in-line coating station) and surface energies of 40 dyne-cm/cm$^2$ or more are obtained prior to coating, it has been found that after the transverse orientation portion of the process, the polyetheramine layer can be easily delaminated from the polyolefin substrate.

Without being bound to any theory, it is believed that during the transverse orientation process, two phenomena are occurring: 1) The surface area of the substrate greatly increases, thus greatly reducing the per-unit area density of the active treated sites for the polyetheramine polymers to adhere adequately; 2) During the preheating and stretching sections of the transverse direction orientation oven, the active treated sites and functional groups imparted by the discharge treatment method, migrate from the surface of the polyolefin substrate into the substrate itself, thus decreasing the amount of active sites for adhesion. Thus, other methods are preferably employed to help maintain robust adherence of the polyetheramine layer to the substrate during and after the orientation process.

Phenoxy-type thermoplastics, including polyhydroxy ether, polyhydroxy ester ethers, and polyhydroxy amino ethers, are described in the literature such as *Polymer Preprints*, 34(1), 904-905 (1993). Polyhydroxy amino ether (PHAE), also called polyetheramine, is an epoxy-based thermoplastic. Its repeating unit is composed of aromatic ether and ring or linear amine in the backbone chain, and hydroxyl groups in the pendants from the opening of the epoxy groups. The basic PHAE is made of bis-phenol A diglycidyl ether (BADGE) and ethanol amine. Property modification can be achieved by copolymerization of BADGE and resorcinol diglycidyl ether (RDGE) with ethanol amine which improves gas barrier properties. The amount of the RDGE component in the PHAE copolymer could determine the effectiveness of the gas barrier properties. Increasing the percentage by weight of the RDGE component in the copolymer, improves further the oxygen gas barrier properties as shown in Table A (from Dow Chemical Company technical report "Building BLOX®—New Thermoplastic Adhesive and Barrier Resins" by Terry Glass and Marie Winkler, 2001).

TABLE A

| % RDGE | O2TR (cc/m²/day) |
| --- | --- |
| 25 | 5.9 |
| 30 | 3.1 |
| 50 | 0.62 |

U.S. Pat. No. 5,275,853 describes the composition and process of making polyetheramine. The polyetheramine for the laminate film of this invention could be made by the process of U.S. Pat. No. 5,275,853.

One embodiment of this invention is at least a single base layer of polyolefin resin such as polypropylene, copolymers of propylene, polyethylene, copolymers of ethylene, and blends thereof. Other embodiments can include one or more skin layers on either or both sides of said base layer for specialized properties such as sealability, metal adhesion, tie-layers, barrier, printability, slip, antiblock, lamination improvement, and other such needs. Another embodiment would include making the core or base layer a cavitated opaque film by means of cavitating agents. The cavitated film can also be made whiter by optionally adding $TiO_2$. In yet other embodiments of the invention, the laminate film comprises: an isotactic polypropylene resin layer with one side discharge-treated for high surface energy suitable for printing or coating, a heat sealable ethylene-propylene-butylene terpolymer layer coextruded onto one side of the core layer opposite the discharge-treated surface; and a polyetheramine layer coated onto the discharge-treated surface of the polypropylene resin layer.

Other embodiments include a "tie-layer" to bond effectively the polyetheramine layer to the propylene homopolymer core layer. A suitable formulation for this tie-layer is TOTAL EOD 0437 mini-random propylene homopolymer or TOTAL 3576X propylene homopolymer, both which could be blended with MITSUI ADMER QF551A maleic anhydride-grafted ethylene propylene copolymer. MITSUI ADMER QF500A maleic anhydride-grafted propylene homopolymer can also be used. The amount of anhydride in these grafted polymers is about 0.12 weight percent to 0.15 weight percent. The maleic anhydride-grafted propylene-containing polymers can contain some ethylene-propylene rubber or it may not. The amount by weight of maleic anhydride-grafted propylene-containing polymer in the tie-layer is about 5 weight percent to 100 weight percent, preferably 10-50 weight percent, and more preferably 15-30 weight percent.

Alternatively, the tie-layer can be comprised of a blend of: ethylene-propylene copolymer and ethylene polar terpolymers such as ethlyene-butyl acrylate-maleic anhydride copolymer and/or ethylene-glycidal methacrylate-methyl acrylate copolymer. The ethylene-propylene copolymer (EP copolymer) can be of any number of commercially available EP copolymers, ranging from 1 mol percent ethylene to about 70 mol percent ethylene. Suitable EP copolymers suitable for this tie-layer are for example, TOTAL 8473 (a nominal 4 mol percent ethylene content EP copolymer) and LANXESS BUNA EP-T-2070-P (a nominal 65-71 mol percent ethylene content EP copolymer). Preferably, the EP copolymer component of this tie-layer is in the 3-6 mol percent ethylene content range. Preferred ethylene polar terpolymers for this tie-layer are such as those available from ARKEMA: LOTADER 4210 (an ethylene-butyl acrylate-maleic anhydride terpolymer) or LOTADER AX8900 (an ethylene-glycidal methacrylate-methyl acrylate terpolymer). LOTADER 4210 is a copolymer of about 91 weight percent ethylene, 6 weight percent butyl acrylate, and 4 weight percent maleic anhydride; it should be noted that LOTADER 4210 is not a grafted maleic anhydride polymer like ADMER QF551A or QF500A. LOTADER AX8900 is a copolymer of about 67 weight percent ethylene, 8 weight percent glycidal methacrylate, and 25 weight percent methyl acrylate. The blending ratio of this alternate tie-layer formulation is 0-95 weight percent EP copolymer to 100 weight percent-5 weight percent of the ethylene polar terpolymer respectively. Preferred is about 10 weight percent to 50 weight percent of the ethylene polar terpolymer, more preferred is 20-40 weight percent of the ethylene polar terpolymer, with the respective balance made up of the EP copolymer.

The tie-layer can be coextruded on one side of the core layer having a thickness after biaxial orientation between 0.1 and 5 µm, preferably between 0.5 and 3 µm, and more preferably between 0.5 and 1.0 µm. For the tie-layer, it is also contemplated to add an antiblock to aid in film handling. A small amount of inorganic antiblocking agent may be optionally added up to 1000 ppm to this resin layer. Preferably 300-500 ppm of antiblock may be added. Suitable antiblock agents include those such as inorganic silica, sodium calcium aluminosilicate, crosslinked silicone polymers such as polymethylsilsesquioxane, and polymethylmethacrylate spheres. Preferred useful particle sizes of these an antiblock ranges from 1-12 um, more preferably in the range of 2-6 um.

The polypropylene resin layer is a crystalline polypropylene of specific isotactic content and can be uniaxially or biaxially oriented. Crystalline polypropylenes are generally described as having an isotactic content of about 90 percent isotactic index (II) or greater. Suitable examples of crystalline polypropylenes for this invention are Fina 3270 and Exxon-Mobil PP4772. These resins also have melt flow rates of about 0.5 to 5 g/10 min, a melting point of about 163-167° C., a crystallization temperature of about 108-126° C., a heat of fusion of about 86-110 J/g, a heat of crystallization of about 105-111 J/g, and a density of about 0.90-0.91. The core resin layer is typically 5 µm to 50 µm in thickness after biaxial orientation, preferably between 10 µm and 25 µm, and more preferably between 12.5 µm and 17.5 µm in thickness. Additionally, a small amount of inorganic antiblocking agent may be optionally added up to 1000 ppm to this resin layer. Preferably 300-500 ppm of antiblock may be added. Suitable antiblock agents comprise those such as inorganic silica, sodium calcium aluminosilicate, a crosslinked silicone polymer such as polymethylsilsesquioxane, and polymethylmethacrylate sphere. Typical useful particle sizes of an antiblock range from 1-12 um, preferably in the range of 2-6 um.

The tie-layer or the polypropylene resin layer can be surface treated with a corona-discharge method, flame treatment, atmospheric plasma, or corona discharge in a controlled atmosphere of nitrogen, carbon dioxide, or a mixture thereof. The latter treatment method in a mixture of $CO_2$ and $N_2$ is preferred. This method of discharge treatment results in a treated surface that comprises nitrogen-bearing functional groups, preferably 0.3 percent or more nitrogen in atomic percent, and more preferably 0.5 percent or more nitrogen in atomic percent. This treated core layer can then be metallized, printed, coated, or extrusion or adhesive laminated.

A heat sealable layer or non-heat sealable layer may be coextruded with the core layer opposite the tie-layer having a thickness after biaxial orientation of between 0.2 and 5 µm, preferably between 0.6 and 3 µm, and more preferably between 0.8 and 1.5 µm. The heat sealable layer may contain an anti-blocking agent and/or slip additives for good machinability and a low coefficient of friction in amount preferably about 0.05-0.5 percent by weight of the heat-sealable layer. The heat sealable layer is preferably a copolymer of propylene, either ethylene-propylene or butylene-propylene, and preferably includes a ternary ethylene-propylene-butene copolymer. A suitable heat sealable terpolymer resin is SUMITOMO SPX78H8 or SUMITOMO SPX79F1. Preferably if the invention includes a non-heat sealable, winding layer, this layer will include a crystalline polypropylene with anti-blocking and/or slip additives or a matte layer of a block copolymer blend of polypropylene and one or more other polymers whose surface is roughened during the film formation step so as to produce a matte finish on the winding layer. Preferably, the surface of the winding layer is discharge-treated to provide a functional surface for lamination or coating with adhesives and/or inks.

The coextrusion process includes a three-layered compositing die. The polymer core layer is sandwiched between the polar resin layer and the heat sealable or winding layer. The three layer laminate sheet is cast onto a cooling drum whose surface temperature is controlled between 20° C. and 60° C. to solidify the non-oriented laminate sheet. The non-oriented laminate sheet is stretched in the longitudinal direction at about 135 to 165° C. at a stretching ratio of about 4 to about 5 times the original length and the resulting stretched sheet is cooled to about 15° C. to 50° C. to obtain a uniaxially oriented laminate sheet. The uniaxially oriented laminate sheet is introduced into a tenter and preliminarily heated between 130° C. and 180° C., and stretched in the transverse direction at a stretching ratio of about 7 to about 12 times the original length and then heat set to minimize shrinkage and give a biaxially oriented sheet. The biaxially oriented film has a total thickness between 6 and 40 µm, preferably between 10 and 20 µm, and most preferably between 12 and 18 µm.

The polyetheramine layer is aqueous solution-coated onto the discharge-treated side of the polypropylene resin layer. The polyetheramine polymer is preferably 10-70 mol percent RDGE comonomer content, more preferably 30-50 mol percent RDGE comonomer content. The percent solids of the aqueous solution is from 10-50 percent, preferably 15-40 percent, and more preferably 25-35 percent with a viscosity of less than 50 cps. After drying, the dry coating weight of the polyetheramine layer is 0.5-5 mg/in$^2$, preferably 1.0-3.0 mg/in$^2$, and more preferably 1.5-2.5 mg/in$^2$. Suitable types of polyetheramine is that obtainable from Dow Chemicals under the trade name "BLOX®" or from ICI Packaging Coatings under the trade name "OXYBLOC®." In particular, BLOX® 5000 series grade is suitable for solution coating which has an RDGE comonomer content of 50 mol percent in the polyetheramine polymer. ICI's polyetheramine coating grade OXYBLOC® 670C1370 is also suitable and can be made available with RDGE comonomer content of 30 mol percent, 40 mol percent, and 50 mol percent or other amounts. The resulting clear film was tested for gas barrier properties and adhesion of the coating to the polypropylene substrate. The aqueous coating can be applied either "in-line" or "out-of-line." In an "in-line" coating, the coating station is located after the machine direction stretching process of a monoaxial or biaxial orientation process and dried in a drying oven or using the tenter oven preheating zones as a dryer. In the case of biaxial orientation, the coated monoaxially stretched film is then stretched in the transverse direction. An advantage of this process is that the orientation and coating of an embodiment of the invention can be essentially done in one processing step.

It is often beneficial to in-line discharge treat the monoaxial substrate prior to the coating station so that the aqueous solution adequately "wets" the substrate surface for consistent coating weight, drying, and appearance. In an "out-of-line" coating process, the finished monoaxial or biaxial film is wound up in a roll form, and is mounted on a separate coating machine. Again, the monoaxial or biaxial film substrate should have the desired surface for coating with the polyetheramine solution discharge-treated in order that the solution adequately wets the surface. This separate coating line will then apply the solution, dry it, and rewind the finished product. The preferred method to coat in this embodiment is via the in-line coating process. In this case, the use of the mixed resin tie-layer is most advantageous to improve adhesion of the polyetheramine to the propylene-based resin substrate. In out-of-line coating, the use of the mixed resin tie-layer was not necessary for adequate bonding of the polyetheramine to the propylene-based substrate so long as surface discharge-treatment of the substrate was adequate for the aqueous solution to wet-out. Unexpectedly, it was found that surface discharge-treating of the monoaxially stretched propylene-based substrate in the in-line process did not provide adequate adhesion of the polyetheramine to the substrate; however, the addition of a polar additive component such as maleic anhydride-grafted EP copolymer or ethylene polar terpolymer provided excellent adhesion of the polyetheramine to the substrate.

In another embodiment, the mixed resin layer need not be a discrete layer coextruded onto one side of the core layer. The core layer itself can include a blend of the propylene homopolymer and maleic anhydride-grafted propylene homopolymer or copolymer; or a propylene homopolymer, ethylene-propylene copolymer, and ethylene polar terpolymer. In this embodiment, the polyetheramine coating can be applied directly to one side of the mixed resin core layer.

The polyetheramine resin can also be extrusion-coated onto the polymer substrate rather than solution-coated. Dow Chemical BLOX® grades for extrusion-coating that are suitable include but are not limited to BLOX® 4000 series and 0000 series. Similar to the solution-coating method, the extrusion-coating can be done either in-line—whereby the extrusion coating station is located after the first direction stretching process onto the monoaxially oriented film—or out-of-line whereby the extrusion-coating process is done on a separate machine onto the monoaxially or biaxially stretched substrate. It may also be desirable for the substrate to have the surface designated for coating to be discharge-treated in order that adequate adhesion of the BLOX® coating is obtained or to use a tie-resin formulation as part of the substrate.

The polyetheramine layer may also be applied via coextrusion with the substrate layer. In this case, a compositing die is used to combine the melt streams of the polyetheramine extrudate with the substrate extrudate which is either a polyolefin of polyester. In this case, no discharge-treatment of the substrate is necessary as enough intermolecular mixing at the interface of the polyetheramine extrudate and substrate extrudate assures adequate bonding of the two layers. However, it may be desirable to use a tie-resin formulation as part of the base layer or as a separate intermediate tie-layer between the base layer and the polyetheramine layer to ensure adequate adhesion of the layers. This coextrudate can then be cast onto a chill roll, quenched, then monoaxially or biaxially stretched into the final film product. The coextruded polyetheramine skin resin layer in this case has a thickness between 0.2 and 2 µm, preferably between 0.5 and 1.5 µm, more preferably 0.75-1 um, after biaxial orientation.

A preferred embodiment is to metallize the surface of the polyetheramine layer. The unmetallized laminate sheet is first wound in a roll. The roll is placed in a metallizing chamber and the metal vapor-deposited on the polyetheramine resin layer surface. The metal film may include titanium, vanadium, chromium, manganese, iron, cobalt, nickel, copper, zinc, aluminum, gold, or palladium, the preferred being aluminum. The metal layer shall have a thickness between 5 and 100 nm, preferably between 20 and 80 nm, more preferably between 30 and 60 nm; and an optical density between 1.5 and 5.0, preferably between 2.0 and 4.0, more preferably between 2.3 and 3.2. The metallized film is then tested for oxygen and moisture permeability, optical density, metal adhesion, and film durability.

Recycling of PHAE-coated substrate films is accomplished by shredding the waste or scrap film or into "fluff" via a number of commercially available means such as grinder assemblies. The fluff can be fed back into the main extruder of the film-making process or it can be further processed into granules. If the latter, the fluff is melt extruded and pelletized into pellets. The latter form of pellets is often easier to handle, store, and use in extrusion processes.

The compatibilizing agent can be added either during the process of pelletizing the recycle film fluff into pellets or during extrusion of the base layer during film-making. The compatibilizing agent reduces the inherent incompatibility between the polar PHAE coating and the non-polar polyolefin matrix material like propylene-based polymers. The compatibilizing agent is composed of a polyolefin and polar functional groups like anhydride, acid, ionomers, hydroxyl, ester, and/or amide. In particular, a compatibilizing agent from Evalca, GF-30, is particulary preferred. It is an ethylene-based polymer grafted or copolymerized with functional groups of anhydride, amide, and/or ester groups. Its density is 0.96 g/cm$^3$, melting point 111° C. via DSC endotherm peak temperature method, Vicat softening point of 96° C. via ISO 306-1987 method A—10N load, and a melt flow rate of 1.3 g/10 min at 190° C. The compatibilizing agent GF-30 can be used as a blend with the recycled PHAE coated pellets and the base layer propylene-based polymer pellets at 1-10 weight percent of the base layer, more preferably 2-4 weight percent of the base layer.

This invention will be better understood with reference to the following examples, which are intended to illustrate specific embodiments within the overall scope of the invention.

EXAMPLES AND COMPARATIVE EXAMPLES

Multi-layer BOPP film was made using sequential orientation process with some or all of the following materials:

PHAE, ICI Oxybloc 3000 with 30 mol percent resorcinol diglycidyl ether, aqueous emulsion, 32 percent solids.

Compatibilizing agent, Evalca GF-30, ethylene-based polymer grafted or copolymerized with functional groups such as anhydride, amide, and ester.

Propylene homopolymer, ExxonMobil PP4772, 1.5 MFR (melt flow rate).

Ethylene-propylene-butene terpolymer, Sumitomo SPX79F1, MFR 9.

Propylene mini-random homopolymer, TOTAL EOD 0437, MFR 3.2

In one embodiment, the multi-layer BOPP film contained PP4772 as core layer, one skin layer of EOD0437; opposite skin layer on core of SPX79F1 via coextrusion through a die, cast on a chill drum, oriented in the machine direction through a series of heated and differentially sped rolls, followed by transverse direction stretching in a tenter oven. The EOD0437 skin layer was treated via corona discharge treatment method after orientation. The BOPP film was wound in roll form.

The BOPP film roll was off-line coated via gravure roll with Oxybloc 3000 on the BOPP film's treated surface and dried to achieve a final coating thickness on the BOPP substrate of ca. 1.25 um. The coated film was granulated into ¼" fluff particles, dry blended with and without the GF-30 at 3 weight percent of the base layer, and melt-extruded and pelletized.

New 3-layer BOPP film was made with PP4772 in core layer plus the melt-compounded recycled coated material either with or without the compatibilizer incorporated, and using skin layers as described above. Table 1 illustrates the improvement of recycling PHAE coated BOPP in processability and appearance by adding the GF-30 compatibilizer:

TABLE 1

| Sample | Core Layer Composition weight % | | | Haze % | # gels/ 80 in$^2$ | Film breaks during orientation |
| --- | --- | --- | --- | --- | --- | --- |
| | PP4772 | Recycled PHAE-coated OPP | GF-30 | | | |
| CEx 1 | 100 | 0 | 0 | 3.2 | 3 | No |
| Ex 1 | 87 | 10 | 3 | 6.8 | 8 | No |
| CEx 2 | 90 | 10 | 0 | 9.7 | 22 | Yes |
| Ex 2 | 77 | 20 | 3 | 14.4 | 12 | No |
| CEx 3 | 80 | 20 | 0 | >20 | >40 | Yes |

Desired levels of haze and gel counts are less than 15 percent and less than 15 gels/80 in$^2$ respectively. It is also desired that no film breaks occur during film-making. As the table show, Comparative Example 1 (CEx 1) which is a control film of 100 percent propylene homopolymer in the core layer had low haze and very few gels. Processability in terms of film breaks was good with none occurring. Comparative Examples 2 and 3 (CEx 2 & 3) show 10 weight percent and 20 weight percent loadings of recycled PHAE-containing polypropylene pellets respectively with no GF-30 compatibilizer added. As shown in Table 1, there is a significant increase in the amount of gels and haze level, as well as film breaks during the orientation process.

Examples 1 and 2 (Ex 1 & 2) also include 10 weight percent and 20 weight percent PHAE recycle material plus the addition of 3 weight percent GF-30 compatibilizer. As the table shows, there is a significant reduction in haze and especially gel count compared to CEx 2 and CEx 3. Moreover, film processability in comparison to CEx 2 and CEx 3 was greatly improved with no film breaks occurring. The addition of a small amount of compatibilizer produces acceptable appearing film and maintains film-making processability, comparable to the control in CEx 1.

Test Methods

The various properties in the above examples were measured by the following methods:

A) Haze was measured using a BYK Gardner Haze-Gard Plus hazemeter substantially in accordance with ASTM D1003.

B) Gel count was measured by taking three 10"×8" pieces of the subject film and physically counting the number of visible gels by eye. The average number of gels for the 3 film samples was reported.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

We claim:

1. A laminate film comprising a polyolefin-containing base layer comprising at least 1 weight percent recycled polyolefin material comprising PHAE and an amount of compatibilizing agent comprising an ethylene-based polymer grafted or copolymerized with an anhydride functional group, an amide functional group, or an ester functional group such that the laminate film has a gel count of less than 15 gels/80 in$^2$.

2. The laminate film of claim 1, wherein the laminate film contains at least 10 weight percent recycled polyolefin material comprising PHAE.

3. The laminate film of claim 1, wherein the laminate film contains at least 20 weight percent recycled polyolefin material comprising PHAE.

4. The laminate film of claim 1, further comprising a tie-layer.

5. The laminate film of claim 4, wherein the polyolefin-containing base layer or the tie-layer is discharge-treated.

6. The laminate film of claim 1, comprising a polyetheramine resin-containing layer.

7. The laminate film of claim 6, further comprising a vacuum deposited metal layer on the polyetheramine resin-containing layer.

8. The laminate film of claim 1, wherein a haze of the laminate film is less than 15 percent.

9. The laminate film of claim 1, further comprising a crystalline polypropylene and an inorganic antiblocking agent.

10. The laminate film of claim 9, wherein the winding layer comprises a matte layer of a block copolymer blend of polypropylene and one or more other polymers, the matte layer having a roughened surface, and the winding layer is a discharge treated winding layer having a surface for lamination or coating with adhesives or inks.

11. The laminate film of claim 9, wherein the winding layer comprises an antiblock component selected from the group consisting of amorphous silica, aluminosilicate, sodium calcium aluminum silicate, a crosslinked silicone polymer, and polymethylmethacrylate.

12. The laminate film of claim 1, wherein the polyolefin-containing base layer comprises cavities.

13. The laminate film of claim 12, wherein the polyolefin-containing base layer further comprises $TiO_2$.

14. The laminate film of claim 1, further comprising a heat sealable layer comprising an antiblock component selected from the group consisting of amorphous silica, aluminosilicate, sodium calcium aluminum silicate, a crosslinked silicone polymer, and polymethylmethacrylate.

15. The laminate film of claim 7, wherein the metal layer is an aluminum layer.

16. The laminate film of claim 4, wherein the polyolefin-containing base layer or the tie layer is discharge treated in an atmosphere of carbon dioxide, oxygen, nitrogen or combinations thereof.

17. The laminate film of claim 4, wherein the tie layer comprises a non-polyetheramine-resin containing material.

18. The laminate film of claim 4, wherein the tie layer comprises a maleic anhydride-grafted ethylene propylene copolymer, a maleic anhydride-grafted propylene homopolymer, a blend of an ethylene-propylene copolymer and an ethylene polar terpolymer.

19. The laminate film of claim 10, wherein the winding layer is discharge treated in an atmosphere of carbon dioxide, oxygen, nitrogen or combinations thereof 20. The laminate film of claim 18, further comprising a vacuum deposited metal layer on the tie layer.

21. The laminate film of claim 20, wherein the metal layer is an aluminum layer.

* * * * *